UNITED STATES PATENT OFFICE.

JACOB PHILIP, OF HAMBURG, GERMANY.

IMPROVEMENT IN THE MANUFACTURE OF ARTIFICIAL SULPHATES OF BARYTA.

Specification forming part of Letters Patent No. 120,771, dated November 7, 1871.

*To all whom it may concern:*

Be it known that I, JACOB PHILIP, of Hamburg, Germany, have invented a new and useful Improvement in Treating "Kieserit;" and I do hereby declare the following to be a full, clear, and exact description thereof, which will enable those skilled in the art to make and use the same.

This invention relates to certain improvements in treating kieserit for the manufacture of white of baryta or "blanc-fix," pearl-hardening, precipitated sulphate of lime, and the substitutes for these materials.

In preparing white of baryta or blanc-fix I take a solution of sulphate of magnesia derived from raw sulphate of magnesia, commonly called kieserit, or of epsom salt, and add it to a solution of muriate of baryta, nitrate of baryta, or other soluble salts of baryta, in suitable proportion, which can readily be fixed by chemists. By preference I use muriate of baryta, and the muriate of magnesia which precipitates from the solution I utilize by employing it either for preparing cements or artificial marble, or for the preparation of muriatic acid or caustic magnesia, or for dressing textile fabrics, or for preparing muriate of lime and hydrate of magnesia. The muriate of lime thus obtained I prefer to use again in the preparation of baryta in the following manner—that is to say: After having precipitated the muriate of magnesia by the addition of caustic lime, and thus obtaining muriate of lime, I prepare therefrom muriate of baryta according to the methods generally in use; and this muriate of baryta I employ again for manufacturing white of baryta or blanc-fix. The precipitated hydrate of magnesia obtained by my method, as described, I either calcine and employ in the preparation of magnesia cement, or I add the same to the pulp used in making paper or papier-maché, or I use it for medical or chemical purposes.

By treating kieserit or epsom salt with pure caustic lime or lime-white I obtain a compound of sulphate of lime and hydrate of magnesia which, when properly washed, forms a superior pearl-hardening, to be used with advantage in the manufacture of paper or papier-maché.

In some cases I substitute in this treatment of kieserit caustic baryta or caustic strontia for the caustic lime, and then I realize precipitates of sulphate of baryta or the sulphate of strontia mixed with hydrate of magnesia. A similar result is produced by treating kieserit or epsom salt with a solution of muriate of lime, which I obtain by adding hydrate of lime to a solution of muriate of magnesia; or, by dissolving limestone in muriatic acid and by mixing this solution with sulphate of magnesia or kieserit, I obtain sulphate of lime as a precipitate, which, after a previous ablution, may be used as pearl-hardening in the manufacture of paper or papier-maché, or to be mixed with colors for paper-hangings, and also for any of the other purposes for which precipitated or fine-ground sulphate of lime is usually employed.

For dressing or finishing spun fabrics I prefer either to pass the same through a solution of sulphate of magnesia derived from kieserit or epsom salt, or also I apply to the fabrics thus steeped a solution of muriate of lime, or muriate of baryta, or muriate of strontia, or lime-white, hydrate of baryta, or hydrate of strontia, whereby additional gloss and weight are given to these fabrics.

What I claim as new, and desire to secure by Letters Patent, is—

1. The product obtained by treating kieserit or epsom salt with soluble salts of baryta, substantially in the manner described.

2. The product obtained by treating kieserit or epsom salt with caustic lime, caustic baryta, or caustic strontia, in the manner herein set forth.

3. The product obtained by treating kieserit or epsom salt with muriate of lime, produced and applied in the manner described.

This specification signed by me this 5th day of October, 1871.

JACOB PHILIP.

Witnesses:
W. HAUFF,
E. F. KASTENHUBER.

(35)